US012488725B2

(12) United States Patent
Hai

(10) Patent No.: US 12,488,725 B2
(45) Date of Patent: Dec. 2, 2025

(54) GRAYSCALE CALIBRATING METHOD FOR DISPLAY PANEL AND DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Bo Hai, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/552,560

(22) PCT Filed: May 16, 2023

(86) PCT No.: PCT/CN2023/094415
§ 371 (c)(1),
(2) Date: Sep. 26, 2023

(87) PCT Pub. No.: WO2024/221500
PCT Pub. Date: Oct. 31, 2024

(65) Prior Publication Data

US 2024/0371308 A1 Nov. 7, 2024

(30) Foreign Application Priority Data

Apr. 27, 2023 (CN) ......................... 202310480162.9

(51) Int. Cl.
*G09G 3/20* (2006.01)

(52) U.S. Cl.
CPC ... *G09G 3/2074* (2013.01); *G09G 2320/0242* (2013.01); *G09G 2320/066* (2013.01);
(Continued)

(58) Field of Classification Search
CPC ...... G09G 3/2003; G09G 3/2074; G09G 3/30; G09G 2320/0242; G09G 2320/0271;
(Continued)

(56) References Cited

U.S. PATENT DOCUMENTS 10,621,931 B2 * 4/2020 Kang .................. G09G 3/3413
2012/0086743 A1 * 4/2012 Shiomi ............... G09G 3/3659 345/694
2021/0233457 A1 * 7/2021 Xiong ................. G09G 3/2074

FOREIGN PATENT DOCUMENTS

CN 108063935 A 5/2018
CN 109686323 A 4/2019
(Continued)

OTHER PUBLICATIONS

International Search Report in International application No. PCT/CN2023/094415, mailed on Jan. 17, 2024, with English translation.
(Continued)

*Primary Examiner* — Nelson M Rosario
(74) *Attorney, Agent, or Firm* — HSML P.C.

(57) ABSTRACT

The present application provides a grayscale calibrating method for a display panel and a display device. The grayscale calibrating method for a display panel includes obtaining a screen image to be displayed of the display panel, and determining whether the screen image to be displayed exists in an abnormal display region; when the screen image to be displayed exits in the abnormal display region, increasing the grayscale of each of the first sub-
(Continued)

pixels located in the first display region by changing a white balance component to improve the display effect of the abnormal display region.

16 Claims, 8 Drawing Sheets

(52) U.S. Cl.
CPC ............... *G09G 2320/0666* (2013.01); *G09G 2320/0673* (2013.01); *G09G 2320/0686* (2013.01); *G09G 2320/0693* (2013.01); *G09G 2360/16* (2013.01)

(58) Field of Classification Search
CPC ..... G09G 2320/066; G09G 2320/0666; G09G 2320/0673; G09G 2320/0686; G09G 2320/0693; G09G 2360/16
See application file for complete search history.

(56) References Cited

FOREIGN PATENT DOCUMENTS

| | | | |
|---|---|---|---|
| CN | 110689588 | A | 1/2020 |
| CN | 112002278 | A | 11/2020 |
| CN | 112700749 | A | 4/2021 |
| CN | 114120906 | A | 3/2022 |
| CN | 114613339 | A | 6/2022 |
| CN | 114822351 | A | 7/2022 |
| KR | 20080097796 | A | 11/2008 |

OTHER PUBLICATIONS

Written Opinion of the International Search Authority in International application No. PCT/CN2023/094415, mailed on Jan. 17, 2024, with English translation.

* cited by examiner

| Grayscale | R0 | G0 | B0 |
|---|---|---|---|
| 0 | 0 | 0 | 0 |
| 1 | 4 | 4 | 4 |
| 2 | 8 | 8 | 8 |
| 3 | 12 | 12 | 12 |
| ⋮ | ⋮ | ⋮ | ⋮ |
| 253 | 1012 | 1012 | 1012 |
| 254 | 1016 | 1016 | 1016 |
| 255 | 1020 | 1020 | 1020 |

FIG. 5

| | | Before improvement | Gamma voltage debugging method | Grayscale debugging method of the present invention |
|---|---|---|---|---|
| Watermark phenomenon | | Watermark Exists | Watermark mitigation | Consistency of watermark mitigation |
| Contrast influence | 0 grayscale brightness | 0.056 | 0.062 | 0.057 |
| | 255 grayscale brightness | 335.9 | 335.9 | 335.9 |
| | Contrast | 5998 | 5418 | 5893 |
| | Contrast | 100% | 90% | 98% |
| | Contrast influence | 100% | -10% | -2% |

FIG. 7

GRAYSCALE CALIBRATING METHOD FOR DISPLAY PANEL AND DISPLAY DEVICE

CROSS REFERENCE TO RELATED APPLICATIONS

This application claims the priority of International Application No. PCT/CN2023/094415, filed on May 16, 2023, which claims priority to Chinese Application No. 202310480162.9, filed on Apr. 27, 2023. The entire disclosures of the above applications are incorporated herein by reference.

FIELD OF INVENTION

The present application relates to a field of display technologies, especially to a grayscale calibrating method for a display panel and a display device.

BACKGROUND OF INVENTION

With the continuous advancement of display technology, people have increasingly high expectations for display quality. Currently, there is still an issue of watermark in different screen images displayed on display panels. To address the watermark issue, improvements are typically made through gamma voltage adjustment. However, gamma voltage adjustment does not differentiate between sub-pixel colors. For example, during gamma voltage adjustment, all red, green, and blue (RGB) sub-pixels are adjusted, resulting in slightly lower adjustment accuracy. Furthermore, the more gamma voltage adjustment is applied to RGB sub-pixels, the more noticeable the improvement in removing the watermark becomes, but it also leads to a more severe reduction in the contrast of the displayed screen image.

SUMMARY OF INVENTION

The present application provides a grayscale calibrating method for a display panel and a display device, with the aim of addressing the watermark issue in improving the displayed screen image, while avoiding a decrease in the contrast of the displayed screen image.

The present application provides a grayscale calibrating method for a display panel, wherein the display panel comprises at least one data line and first sub-pixels and second sub-pixels that are connected to the data line, a color of the first sub-pixel is different from a color of the second sub-pixel, and the data line is configured to sequentially transmit data voltages to the first sub-pixels and the second sub-pixels:

the grayscale calibrating method for a display panel comprises:

the display panel comprising at least one data line and first sub-pixels and second sub-pixels that are connected to the data line, wherein a color of the first sub-pixel is different from a color of the second sub-pixel, and the data line is configured to sequentially transmit data voltages to the first sub-pixels and the second sub-pixels: the grayscale calibrating method for a display panel comprises:

obtaining a screen image to be displayed of the display panel, and determining whether an abnormal display region exists in the screen image to be displayed, wherein the abnormal display region comprises a first display region and a second display region adjacent to each other, the grayscale of each of the first sub-pixels located in the first display region is less than or equal to a predetermined grayscale, and the grayscale of each of the first sub-pixels located in the second display region is greater than the grayscale of each of the first sub-pixels located in the first display region; and when the screen image to be displayed exists in the abnormal display region, increasing the grayscale of each of the first sub-pixels located in the first display region by changing a white balance component to improve a display effect of the abnormal display region.

Optionally, in some embodiments of the present application, the step of increasing the grayscale of each of the first sub-pixels located in the first display region by changing a white balance component comprises:

obtaining an initial white balance data table of the display panel; and according to the color and the grayscale of each of the first sub-pixels located in the first display region, increasing a white balance component of the color corresponding to the grayscale in the initial white balance data table.

Optionally, in some embodiments of the present application, the predetermined grayscale is 0 grayscale, the step of increasing a white balance component of the color corresponding to the grayscale in the initial white balance data table comprises:

increasing a white balance component of the color corresponding to the 0 grayscale in the initial white balance data table such that the an increase corresponding to 0 grayscale is from 1 to 20 grayscale.

Optionally, in some embodiments of the present application, the predetermined grayscale ranges from 0 grayscale to 10 grayscale.

Optionally, in some embodiments of the present application, the predetermined grayscale is 0 grayscale, and the screen image to be displayed is a yellow screen image, green screen image, orange screen image, or blue screen image.

Optionally, in some embodiments of the present application, in the abnormal display region, a grayscale of each of the second sub-pixels located in the first display region and the second display region are within a predetermined grayscale range, the predetermined grayscale is less than a minimum grayscale of the predetermined grayscale range.

Optionally, in some embodiments of the present application, the predetermined grayscale is 0 grayscale, in the second display region, the grayscales of the first sub-pixels are greater than or equal to 1, and the grayscale of the first sub-pixels gradually increase.

Optionally, in some embodiments of the present application, the first sub-pixel comprises a first side and a second side intersecting each other, a length of the first side is greater than a length of the second side, and an extension direction of the data line is parallel to the second side.

Optionally, in some embodiments of the present application, the display panel further comprises third sub-pixels connected to the data line, colors of the first sub-pixels, the second sub-pixels, and the third sub-pixels are different, the data line is configured to sequentially transmit data voltages to the first sub-pixels, the second sub-pixels and the third sub-pixels:

the first sub-pixels are blue sub-pixels, the second sub-pixels are green sub-pixels, and the third sub-pixels are red sub-pixels, in a same column of the first, second, and sub-pixels, the blue sub-pixel, the green sub-pixel and the red sub-pixel are arranged sequentially and repeatedly, and colors of the first, second, and third sub-pixels in the same columns are the same.

Accordingly, the present application also provides a display device, comprising a display panel and a driving device. The driving device is configured to implement any one of the above grayscale calibrating methods for a display panel.

In the grayscale calibrating method for a display panel provided by the present application, after obtaining a screen image to be displayed, it is possible to determine the presence of abnormal display regions within the screen image based on the grayscale distribution characteristics of these regions. Subsequently, when the screen image to be displayed does indeed contain abnormal display regions, the method involves enhancing the display effect of these regions by increasing the grayscale of each of the first sub-pixels located in the first display region. It is worth noting that the white balance component corresponding to different colors for the same grayscale can be adjusted independently. Therefore, the present application allows for individual adjustment of the grayscale of the first sub-pixels located in the first display region by modifying their white balance component. This adjusting method is finer and offers greater precision and does not affect the second sub-pixels. This approach, in addition to addressing the watermark issue in improving the displayed screen image, effectively prevents a decrease in contrast.

DESCRIPTION OF DRAWINGS

FIG. 5 is a schematic view of an initial white balance data table provided by the present application:

FIG. 7 is a schematic view of watermark mitigation effects corresponding to different grayscale calibrating methods provided by the present application.

DETAILED DESCRIPTION OF PREFERRED EMBODIMENTS

The following will combine the drawings in the present application's embodiment to describe the technical solution in the embodiment of the present application. The described embodiments are only intended to explain the ideas created by the present invention and should not be considered as limitations to the scope of protection of this application. Furthermore, the terms "first" and "second" are used solely for descriptive purposes and should not be understood as indicating or implying relative importance or implying the quantity of the indicated technical features. Therefore, features labeled as "first" and "second" may explicitly or implicitly include one or more of the described features.

The present application provides a grayscale calibrating method for a display panel and a display device, which will be described in detail as follows. It should be clarified that the description sequence of the following embodiments is not intended to impose any specific order of preference on the embodiments of the present application.

Figure 1:
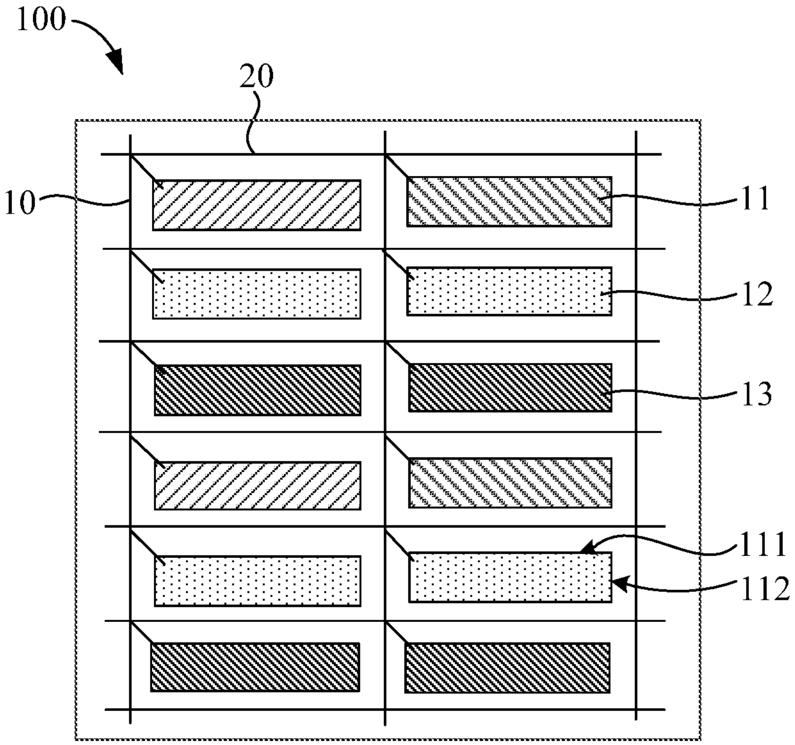
FIG. 1 is a schematic structural view of a display panel provided by the present application.

With reference to FIG. 1, FIG. 1 is a schematic diagram of a display panel according to an embodiment of the present application. In the embodiment of the present application, a display panel 100 comprises at least one data line 10 and first sub-pixels 11 and second sub-pixels 12 that are connected to the data line 10. A color of the first sub-pixel 11 is different from a color of the second sub-pixel 12. During displaying of the display panel 100, the data line 10 is configured to sequentially transmit data voltage to the first sub-pixels 11 and the second sub-pixels 12.

In particular, the display panel 100 further comprises a plurality of scan lines 20. The data line 10 intersects the scan lines 20. The scan lines 20 can switch on row by row, the data line 10 sequentially transmit data voltages to the first sub-pixels 11 and the second sub-pixels 12.

In the embodiment of the present application, the display panel 100 can also comprise third sub-pixels 13 connected to the data line 10. During displaying of the display panel 100, the data line 10 is configured to sequentially transmit data voltages to the first sub-pixels 11, the second sub-pixels 12, and the third sub-pixels 13.

In the embodiment of the present application, each of the first sub-pixels 11, the second sub-pixels 12, and the third sub-pixels 13 can selected from red sub-pixel, green sub-pixel, blue sub-pixel, white sub-pixel, yellow sub-pixel, and so on. Colors of the first sub-pixels 11, the second sub-pixels 12, and the third sub-pixels 13 can be determined by a pixel framework of the display panel 100.

With reference to FIG. 1, the display panel 100 provided by the embodiment of the present application can adopt a Tri-gate framework. The Tri-gate framework is a common method for lowering costs, and a structure thereof is turning all of the sub-pixels by 90 degrees. In particular, in the Tri-gate framework, each sub-pixel (the first sub-pixel 11, the second sub-pixel 12, or the third sub-pixel 13) comprises a first side 111 and a second side 112 intersecting each other. A length of the first side 111 is greater than a length of the second side 112, and the extension direction of the data line 10 is parallel to the second side 112. As such, when the sub-pixels are arranged in a red, green, and blue (RGB) structure, a number of the scan lines 20 increases to triple, and a number of the data lines 10 reduced to one-third. Moreover, during scanning of each frame displayed screen image row by row, a first row of the scan lines 20 switching on correspond to the first sub-pixels 11, a second row of the scan lines 20 switching on correspond to the second sub-pixels 12, and a third row of the scan lines 20 switching on correspond to the third sub-pixels 13.

In particular, in some embodiments of the present application, the first sub-pixels 11 is a blue sub-pixel, the second sub-pixels 12 is a green sub-pixel, and the third sub-pixels 13 is a red sub-pixel. In the same column of the first, second, and sub-pixels, blue sub-pixels, green sub-pixels, and red sub-pixels are arranged in a repetitive sequence. The colors of the first, second, and third sub-pixels in the same columns are the same. In other words, the display panel 100 adopts a Tri-gate BGR pixel arrangement framework.

Of course, the embodiment provided by the present application for the pixel arrangement framework of the display panel 100 is not limited to the Tri-gate framework. As long as the same data line 10 is connected to different-colored first sub-pixels 11 and second sub-pixels 12 in the same row and sequentially transmits data voltages to the first sub-pixels 11 and the second sub-pixels 12, it is acceptable.

For the above pixel arrangement framework, the inventor discovers through research that because the first sub-pixels 11 and the second sub-pixels 12 are controlled by the same data line 10 and the data line 10 sequentially transmit data voltages to the first sub-pixels 11 and the second sub-pixels 12, the data voltage of the second sub-pixel 12 would be affected by the data voltage of the first sub-pixel 11.

Figure 2:
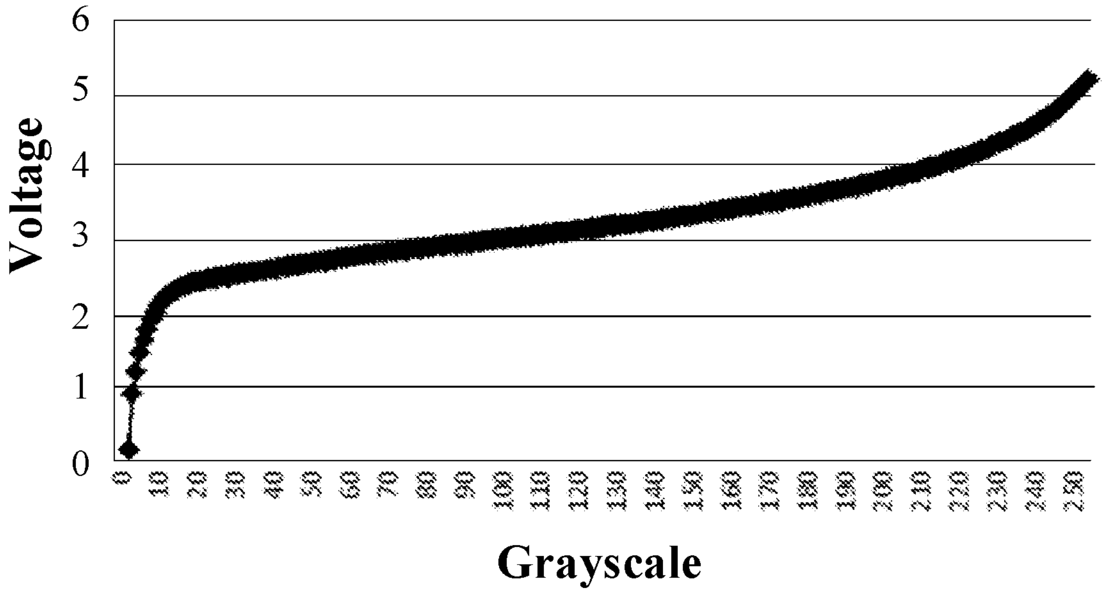
FIG. 2 is a schematic view of a relationship of a grayscale and a voltage provided by the present application.

In particular, with reference to FIG. 2, FIG. 2 is a schematic view of a relationship of a grayscale and a voltage provided by the present application. As shown in FIG. 2, each grayscale corresponds to a voltage, meaning that the data line 10 transmits the data voltage to the corresponding sub-pixel. It can be observed that there is a non-linear relationship between grayscale and voltage. At low grayscale levels, the voltage variation slope is steep, as seen in the range of 0-10 grayscale. When the grayscale of the first sub-pixels 11 is at a low level, it will have a significant impact on the voltage of the second sub-pixels 12, thereby affecting the brightness of the second sub-pixels 12. Therefore, when more first sub-pixels 11 with low grayscales exist in the same region of a displayed screen image, the watermark issue easily occurs.

As such, the embodiment of the present application provides a grayscale calibrating method for a display panel. In the grayscale calibrating method for a display panel of the embodiment of the present application, the abnormal display region is set to include a first display region and a second display region adjacent to each other first. A grayscale of each of the first sub-pixels located in the first display region is less than or equal to a predetermined grayscale, the grayscale of each of the first sub-pixels in the second display region is greater than the grayscale of each of the first sub-pixels located in the first display region. Then, a screen image to be displayed of the display panel is obtained, and it is determined that whether the abnormal display region exists in the screen image to be displayed. Finally, when the screen image to be displayed exists in the abnormal display region, the grayscale of each of the first sub-pixels located in the first display region is increased by changing the white balance component to improve the display effect of the abnormal display region.

The embodiment of the present application predefines an abnormal display region. After obtaining the screen image to be displayed, it can be determined whether there exists an abnormal display region within the screen image based on the predetermined grayscale distribution characteristics of said abnormal display region. Subsequently, when an abnormal display region is detected within the screen image to be displayed, the grayscale of first sub-pixels located in a first display region is increased by adjusting a white balance component. It should be noted that the white balance component can be independently adjusted for different colors corresponding to the same grayscale. Therefore, the embodiment of the present application achieves a fine-grained adjustment of the grayscales of first sub-pixels in the first display region by changing the white balance component, without affecting other sub-pixels. This not only mitigates the watermark issue in the displayed screen image but also effectively avoids a decrease in contrast.

Figure 3:
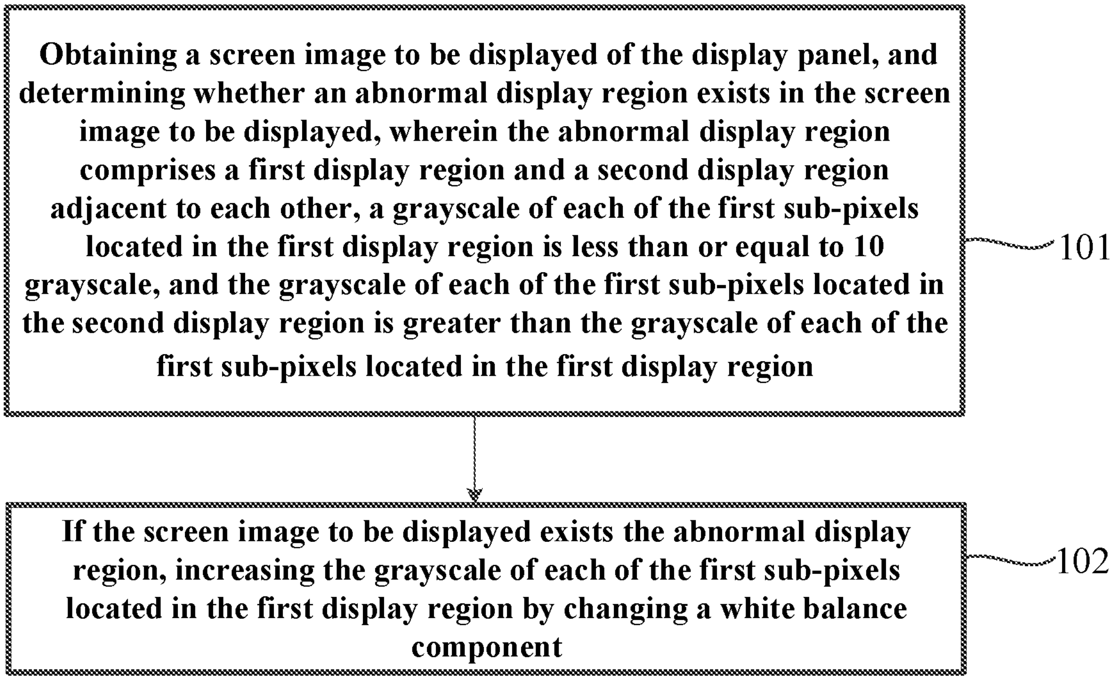
FIG. 3 is a schematic flowchart of a grayscale calibrating method for a display panel provided by the present application.

With reference to FIGS. 1 and 3, FIG. 3 is a schematic flowchart of a grayscale calibrating method for a display panel provided by the present application. In the embodiment of the present application, grayscale calibrating method for a display panel specifically comprises steps as follows:

A step 101 comprises obtaining a screen image to be displayed of the display panel, and determining whether an abnormal display region exists in the screen image to be displayed, wherein the abnormal display region comprises a first display region and a second display region adjacent to each other, a grayscale of each of the first sub-pixels located in the first display region is less than or equal to a predetermined grayscale, and the grayscale of each of the first sub-pixels located in the second display region is greater than the grayscale of each of the first sub-pixels located in the first display region.

The first display region and the second display region can be arranged vertically along an extension direction of the data line 10. Alternatively, the first display region and the second display region can be arranged horizontally along an extension direction of the scan lines 20. It is only required that the first display region and the second display region are disposed adjacently, and the present application has no limit thereto. For instance, when the first display region and the second display region are arranged vertically, the first display region is dark and the second display region is bright to form a brightness difference. Also, both the first display region and the second display region are regions with large areas, and subjectively form a watermark.

The predetermined grayscale can be set according to a relationship between a grayscale and a voltage corresponding to the display panel 100.

It can be understood that division of grayscales of the display panel 100 is determined according to image data of the display panel 100. For example, when the image data of the display panel 100 is binary 8-bit, then the grayscale of the display panel 100 is divided into a range of 0-255 grayscale. When the image data of the display panel 100 is binary 10-bit, then the grayscale of the display panel 100 is divided into a range of 0-1023 grayscale, and so forth. Therefore, when different image data is used for the display panel 100, the grayscale division of the display panel 100 varies, and the relationship between grayscale and voltage may also differ. The value range of the predetermined grayscale is also different in such cases.

Each embodiment of the present application uses an example of image data of the display panel 100 being binary 8-bit for explanation. Under such condition, as shown in FIG. 2, the predetermined grayscale can range from 0 grayscale to 10 grayscale. Namely, a voltage variation slope corresponding to the predetermined grayscale is very high.

In particular, predetermined grayscale can be 0 grayscale, 1 grayscale, 2 grayscale, 5 grayscale, 10 grayscale, etc., With reference to FIG. 2, the less the grayscale is, the higher the voltage variation slope is, the more obvious the pull-down effect of the first sub-pixels 11 to the second sub-pixels 12, and the more obvious a watermark of the abnormal display region is.

The grayscale of the second sub-pixels 12 located in both the first display region and the second display region can be configured based on the actual displayed screen image of the display panel 100.

For instance, in certain embodiments of the present application, the grayscale of the second sub-pixels 12 in both the first display region and the second display region falls within a predetermined grayscale range. The predetermined grayscale is less than the minimum grayscale of the predetermined grayscale range, where the predetermined grayscale range can range from 20 grayscale to 200 grayscale. Alternatively, the predetermined grayscale range includes a range of middle and high grayscales, for example, 90 grayscale to 160 grayscale.

Because the grayscale of the first sub-pixel 11 is less than the grayscale of the second sub-pixel 12, then a data voltage corresponding to the first sub-pixel 11 is less than a data voltage corresponding to the second sub-pixel 12. As such, the pull-down effect of the first sub-pixel 11 to a brightness of the second sub-pixel 12 is obvious, and the displayed screen image easily generate a watermark.

Also for example, in some embodiments of the present application, predetermined grayscale is 0 grayscale. Namely, in the first display region, grayscales of the first sub-pixels 11 are 0. In the second display region, the grayscales of the first sub-pixels 11 are greater than or equal to 1, and the grayscale of the first sub-pixels 11 gradually increase.

It can be known from FIG. 2 that a voltage variation slope corresponding to 0 grayscale is a maximum. Therefore, the first sub-pixel 11 at 0 grayscale has the greatest influence to the second sub-pixel 12. Due to gradual increase in grayscale of the first sub-pixels 11 located in the second display region, the 0 grayscale of the first sub-pixels 11 exerts a different pull-down effect on the second sub-pixels 12, making the displayed screen image more prone to generating a watermark.

In this way, by setting the abnormal display region to be the area where watermarks are more likely to occur, it is possible to detect the screen image to be displayed based on the grayscale distribution characteristics of that abnormal display region, thereby improving the accuracy of watermark improvement.

Additionally, it's possible to store the grayscale distribution characteristics of the abnormal display region in a register or in the timing control chip (TCON) of the display device.

Generally, a System-On chip (SOC) of the display device would output a video signal to the timing control chip. The timing control chip processes the video signal to obtain image data for the screen image to be displayed. The image data includes the grayscale distribution corresponding to each sub-pixel in the screen image to be displayed.

After obtaining the screen image to be displayed, distribution of grayscales of the screen image to be displayed can be analyzed to detect whether a region including grayscale distribution characteristics the same as grayscale distribution characteristics of the abnormal display region exists in the screen image to be displayed, if yes, the region is determined as an abnormal display region.

In the embodiment of the present application, the screen image to be displayed can be a common mixed-color screen image on the display panel 100 in actual applications. For example, when the predetermined grayscale is 0 grayscale, the screen image to be displayed can be a yellow screen image, a green screen image, an orange screen image, a blue screen image, and so on.

When the screen image to be displayed is a yellow screen image, green screen image, or orange screen image, then the first sub-pixels 11 are blue sub-pixels, and there is a region in the screen image to be displayed where 0 grayscale blue sub-pixels are concentrated. When the screen image to be displayed is a blue screen image, then the first sub-pixels 11 are red sub-pixels, and there is a region in the screen image to be displayed where 0 grayscale red sub-pixels are concentrated.

In the case of a yellow screen image, due to the low proportion of blue sub-pixel brightness in the mixed-color screen image, even if the blue sub-pixel in the first display region is at grayscale 0, and the blue sub-pixel in the second display region is at grayscale 1, 2 grayscale, etc., under normal circumstances, it will not result in a watermark, and the subjectively perceived displayed screen image will still appear as a normal screen image. However, in the embodiment of the present application, because the data voltage of the first sub-pixels 11 (blue sub-pixel) affects the data voltage of the second sub-pixels 12 (red sub-pixel or green sub-pixel), there is a significant difference in voltage levels between the first sub-pixels 11 within the first display region and the second display region. This difference in voltage levels has a larger impact on the second sub-pixels 12, thus creating a watermark.

Figure 4:
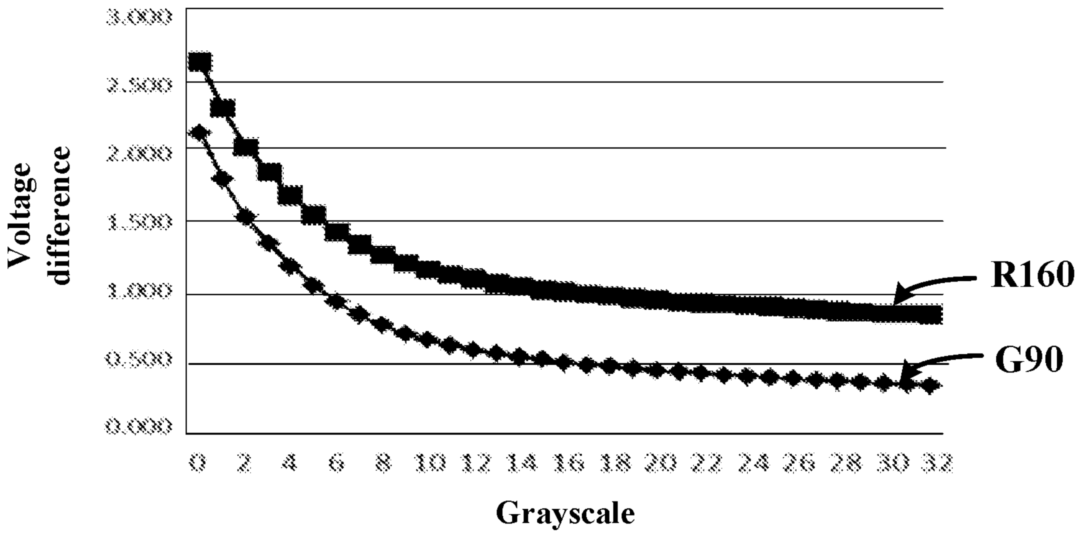
FIG. 4 is a schematic view of a relationship of a voltage difference variation of different grayscales and red, green, and blue (RGB) sub-pixels provided by the present application.

In particular, with reference to Table 1 and FIG. 4, the embodiment of the present application is described using the display panel 100 as shown in FIG. 1. In this example, the first sub-pixels 11 represent the blue sub-pixel (B), the second sub-pixels 12 represent the green sub-pixel (G), and the third sub-pixels 13 represent the red sub-pixel (R). The grayscale value of the first sub-pixels 11 is 0 grayscale, the grayscale value of the second sub-pixels 12 is 90 grayscale, and the grayscale value of the third sub-pixels 13 is 160 grayscale.

TABLE 1

| Grayscale | B Variation Grayscale Voltage | G90 Levels and B Low Grayscale Voltage Difference | R160 Levels and B Low Grayscale Voltage Difference |
|---|---|---|---|
| 0 | 0.79 | 2.14 | 2.62 |
| 1 | 1.1 | 1.83 | 2.31 |
| 2 | 1.36 | 1.57 | 2.05 |
| 3 | 1.54 | 1.39 | 1.87 |
| 4 | 1.7 | 1.23 | 1.72 |
| 5 | 1.83 | 1.1 | 1.58 |
| 6 | 1.94 | 0.99 | 1.47 |
| 7 | 2.03 | 0.9 | 1.38 |
| 8 | 2.1 | 0.83 | 1.31 |
| 9 | 2.16 | 0.77 | 1.25 |
| 10 | 2.2 | 0.73 | 1.21 |
| 11 | 2.24 | 0.69 | 1.17 |
| 12 | 2.27 | 0.66 | 1.14 |
| 13 | 2.3 | 0.63 | 1.12 |
| 14 | 2.32 | 0.61 | 1.09 |
| 15 | 2.34 | 0.59 | 1.08 |
| 16 | 2.36 | 0.58 | 1.06 |
| 17 | 2.27 | 0.56 | 1.04 |
| 18 | 2.38 | 0.55 | 1.03 |
| 19 | 2.4 | 0.53 | 1.02 |
| 20 | 2.41 | 0.52 | 1 |
| 21 | 2.42 | 0.51 | 0.99 |
| 22 | 2.43 | 0.5 | 0.98 |
| 23 | 2.44 | 0.49 | 0.97 |
| 24 | 2.45 | 0.48 | 0.96 |
| 25 | 2.46 | 0.47 | 0.95 |
| 26 | 2.47 | 0.46 | 0.95 |
| 27 | 2.48 | 0.45 | 0.94 |
| 28 | 2.48 | 0.45 | 0.93 |
| 29 | 2.49 | 0.44 | 0.92 |
| 30 | 2.5 | 0.43 | 0.91 |
| 31 | 2.51 | 0.42 | 0.91 |
| 32 | 2.51 | 0.42 | 0.9 |
| . . . | . . . | | |
| 90 | 2.93 | | |
| . . . | . . . | | |
| 160 | 2.41 | | |
| . . . | . . . | | |

It can be known from Table 1 and FIG. 4, in the low grayscale, as the grayscale value varies, the voltage of the blue sub-pixel undergoes significant changes. In other words, the smaller the grayscale value, the steeper the voltage variation slope. Correspondingly, as the grayscale value decreases, the voltage difference between the green sub-pixel and the blue sub-pixel becomes larger, as does the voltage difference between the red sub-pixel and the blue sub-pixel. Therefore, within the first display region and the second display region, there is a substantial difference in voltage levels among the first sub-pixels 11, which leads to a greater disparity in their impact on the second sub-pixels 12, ultimately resulting in the formation of a watermark.

A step 102 comprises when the screen image to be displayed exists the abnormal display region, increasing the grayscale of each of the first sub-pixels located in the first display region by changing a white balance component.

The white balance is configured to balance red, green, and blue components such that the displayed screen image of the display panel 100 can display true color. With reference to FIG. 5, in an initial white balance data table, each grayscale correspondingly includes a red pixel white balance component R0, a green pixel white balance component G0, and a blue pixel white balance component B0.

The initial white balance data table indicates the conversion of 8-bit image data voltage to 10-bit image data voltage. For example, in the 8-bit image data voltage, grayscale 2 corresponds to grayscale 8 in the 10-bit image data voltage, grayscale 3 in the 8-bit image data voltage corresponds to grayscale 12 in the 10-bit image data voltage, and grayscale 255 in the 8-bit image data voltage corresponds to grayscale 1020 in the 10-bit image data voltage, and so forth. The initial white balance data table is a linear data table, meaning that the values for the red pixel white balance component R0, green pixel white balance component G0, and blue pixel white balance component B0 are all the same for a given grayscale value. It should be noted that white balance adjustment is a well-known technique in this field and will not be further elaborated upon here.

Therefore, increasing the white balance component can increase the grayscales of the first sub-pixels 11 in the first display region.

Figure 6:
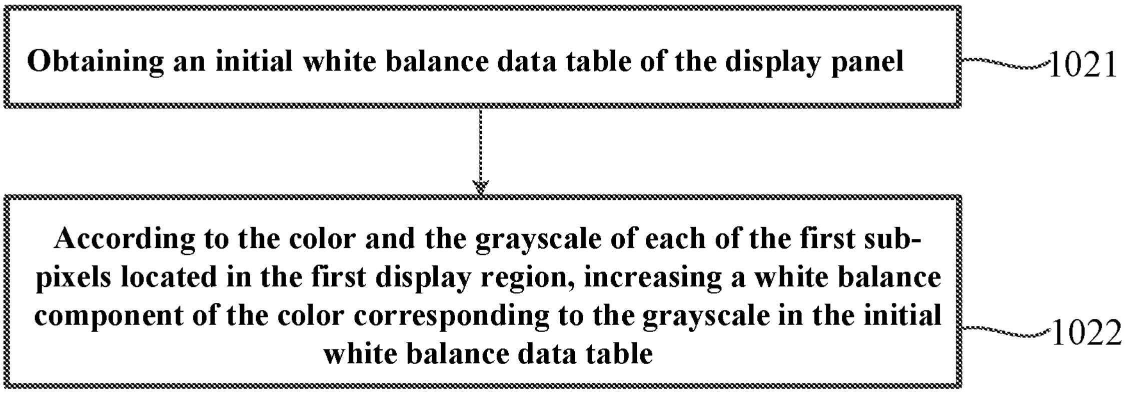
FIG. 6 is a schematic view of a flowchart of steps in FIG. 3 provided by the present application.

In particular, with reference to FIG. 6, FIG. 6 is a schematic view of a flowchart of steps in FIG. 3 provided by the present application. The step 102 comprises steps as follows:

A step 1021 comprises obtaining an initial white balance data table of the display panel.

The initial white balance data table can be stored in a register or the timing control chip.

A step 1022 comprises according to the color and the grayscale of each of the first sub-pixels located in the first display region, increasing a white balance component of the color corresponding to the grayscale in the initial white balance data table.

As shown in FIG. 5, in the initial white balance data table, each grayscale correspondingly includes a red pixel white balance component R0, a green pixel white balance component G0, and a blue pixel white balance component B0. The present application only adjusts the white balance component of a corresponding color according to the color of the first sub-pixel 11. For instance, when the first sub-pixel 11 is a blue sub-pixel, a blue pixel white balance component B0 corresponding to 0 grayscale is increased, and a red pixel white balance component R0 and a green pixel white balance component G0 corresponding to 0 grayscale maintain 0.

In some embodiments of the present application, the step 1022 can specifically include: increasing a white balance component of the color corresponding to the 0 grayscale in the initial white balance data table such that the an increase corresponding to 0 grayscale is from 1 to 20 grayscale.

For example, when image data of the display panel 100 is 8-bit, the initial white balance data table indicates: converting the 8-bit image data voltage to a 10-bit image data voltage. Then, to increase the grayscale of the first sub-pixels 11 from 0 grayscale to 1 grayscale, it is necessary to increase the white balance component corresponding to 0 grayscale from 0 grayscale to 4 grayscale. To increase the grayscale of the first sub-pixels 11 from 0 grayscale to 2 grayscale, it is necessary to increase the white balance component corresponding to 0 grayscale from 0 grayscale to 8 grayscale.

Also, for example, when image data of the display panel 100 is 8-bit, the initial white balance data table indicates: converting the 8-bit image data voltage to a 12-bit image data voltage. Then, to increase the grayscale of the first sub-pixels 11 from 0 grayscale to 1 grayscale, it is necessary to increase the white balance component corresponding to 0 grayscale from 0 grayscale to 16 grayscale. To increase the grayscale of the first sub-pixels 11 from 0 grayscale to 2 grayscale, it is necessary to increase the white balance component corresponding to 0 grayscale from 0 grayscale to 32 grayscale.

In some embodiments of the present application, the increase corresponding to 0 grayscale ranges from 1 to 10 grayscale or from 1 to 5 grayscale. It can be understood that when the white balance component undergoes significant changes, it may affect the white balance performance. Therefore, the embodiment of the present application restricts the increase corresponding to 0 grayscale to a range of 1 to 10 grayscale or 1 to 5 grayscale. This can ensure the improvement of watermark while preserving white balance effectiveness.

Also, logic can be additionally disposed in the timing control chip to realize a function of adjusting a white balance component of a color corresponding to each grayscale.

Furthermore, with reference to FIG. 7, FIG. 7 is a schematic view of watermark mitigation effects corresponding to different grayscale calibrating methods provided by the present application. The embodiment of the present application conducted tests on both the Gamma voltage calibrating method and the grayscale calibrating method.

Before mitigating the watermark on the displayed screen image, the brightness at 0 grayscale was 0.056, while the brightness at 255 grayscale was 335.90, resulting in a contrast of 5998, which is defined as 100%.

After adopting the gamma voltage calibrating method, the watermark on the displayed screen image is mitigated. The brightness at 0 grayscale becomes 0.062, and the brightness at 255 grayscale remains at 335.90. However, the contrast decreases to 5418, which is reduced to 90%. It can be observed that after improving the watermark, the contrast decreases by 10%.

After adopting the grayscale calibrating method described in the present application, the mitigation in the watermark of the displayed screen image is consistent with that achieved using the Gamma voltage calibrating method. The brightness at 0 grayscale is 0.057, and at 255 grayscale, it is 335.90. The contrast is 5893, reduced to 98%. It can be observed that after improving the watermark, the contrast only decreases by 2%. The grayscale calibrating method presented in the application can enhance the displayed screen image's watermark issue and effectively prevent a decrease in the contrast of a displayed screen image.

Figure 8:
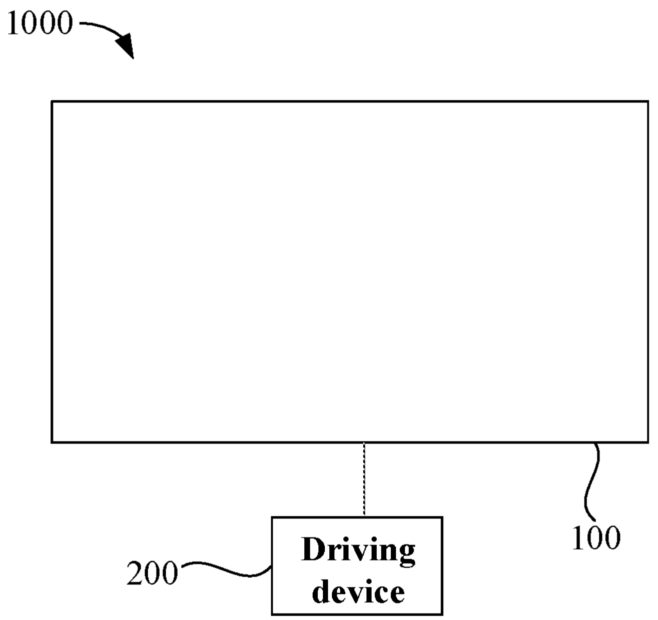
FIG. 8 is a schematic structural view of a display device of the present application.

Accordingly, with reference to FIG. 8, the present application further comprises a display device 1000. The display device 1000 comprises a display panel 100 and a driving device 200. the driving device 200 is configured to implement the grayscale calibrating method for a display panel of any one of the above embodiments.

The driving device 200 can comprise a driver chip and a timing control chip. The driver chip can output a data voltage corresponding to each sub-pixel to the data line. The timing control chip is configured to obtain a screen image to be displayed, and implement the grayscale calibrating method for a display panel of any one of the above embodiments.

The display device 1000 provided by the embodiment of the present application comprises the display panel 100 and the driving device 200. The display device 1000 employs a grayscale calibrating method for a display panel. When adjusting the grayscale of the display panel 100 during calibrating, it is possible to determine whether there is an abnormal display region in the screen image to be displayed according to the settings. By changing the white balance component and increasing the grayscale of the first sub-pixels located in the first display region, it is possible to individually adjust the grayscale of the first sub-pixels. This adjustment method is more precise and does not affect other sub-pixels. While improving the issue of watermarks in the displayed screen image, it effectively avoids a reduction in contrast.

Certainly, the present application may have various other embodiments. Without departing from the spirit and essential principles of the present application, those skilled in the art can make various corresponding changes and modifications according to the present application. However, these corresponding modifications and variants should all fall within the scope of protection defined by the claims attached to the present application.

What is claimed is:

1. A grayscale calibrating method for a display panel, wherein the display panel comprises data lines and first sub-pixels and second sub-pixels that are connected to each of the data lines, a color of the first sub-pixel is different from a color of the second sub-pixel, and the data line is configured to sequentially transmit data voltages to the first sub-pixels and the second sub-pixels;

wherein the grayscale calibrating method for a display panel comprises:

obtaining a screen image to be displayed of the display panel, and determining whether an abnormal display region exists in the screen image to be displayed, wherein the abnormal display region comprises a first display region and a second display region adjacent to each other, a grayscale of each of the first sub-pixels located in the first display region is less than or equal to a predetermined grayscale, the grayscale of each of the first sub-pixels located in the second display region is greater than the grayscale of each of the first sub-pixels located in the first display region, and the predetermined grayscale ranges from 0 grayscale to 10 grayscale; and when the screen image to be displayed exists in the abnormal display region, increasing the grayscale of each of the first sub-pixels located in the first display region by changing a white balance component to improve a display effect of the abnormal display region;

wherein a grayscale of each of the second sub-pixels located in the first display region and the second display region are within a predetermined grayscale range, the predetermined grayscale is less than a minimum grayscale of the predetermined grayscale range;

wherein the predetermined grayscale is 0 grayscale, in the second display region, the grayscales of the first sub-pixels are greater than or equal to 1, and the grayscale of the first sub-pixels gradually increase.

2. The grayscale calibrating method according to claim 1, wherein the step of increasing the grayscale of each of the first sub-pixels located in the first display region by changing a white balance component comprises:

obtaining an initial white balance data table of the display panel; and according to the color and the grayscale of each of the first sub-pixels located in the first display region, increasing a white balance component of the color corresponding to the grayscale in the initial white balance data table.

3. The grayscale calibrating method for a display panel according to claim 2, wherein the predetermined grayscale is 0 grayscale, the step of increasing a white balance component of the color corresponding to the grayscale in the initial white balance data table comprises:

increasing a white balance component of the color corresponding to the 0 grayscale in the initial white balance data table such that the an increase corresponding to 0 grayscale is from 1 to 20 grayscale.

4. The grayscale calibrating method for a display panel according to claim 1, wherein the predetermined grayscale is 0 grayscale, and the screen image to be displayed is a yellow screen image, green screen image, orange screen image, or blue screen image.

5. The grayscale calibrating method for a display panel according to claim 1, wherein the first sub-pixel comprises a first side and a second side intersecting each other, a length of the first side is greater than a length of the second side, and an extension direction of the data line is parallel to the second side.

6. The grayscale calibrating method for a display panel according to claim 5, wherein the display panel further comprises third sub-pixels connected to the data line, colors of the first sub-pixels, the second sub-pixels, and the third sub-pixels are different, the data line is configured to sequentially transmit data voltages to the first sub-pixels, the second sub-pixels and the third sub-pixels;

the first sub-pixels are blue sub-pixels, the second sub-pixels are green sub-pixels, and the third sub-pixels are red sub-pixels, in a same column of the first, second, and sub-pixels, the blue sub-pixel, the green sub-pixel and the red sub-pixel are arranged sequentially and repeatedly, and colors of the first, second, and third sub-pixels in the same columns are the same.

7. A grayscale calibrating method for a display panel, wherein the display panel comprises data lines and first sub-pixels and second sub-pixels that are connected to each of the data lines, a color of the first sub-pixel is different from a color of the second sub-pixel, and the data line is configured to sequentially transmit data voltages to the first sub-pixels and the second sub-pixels;

wherein the grayscale calibrating method for a display panel comprises:

obtaining a screen image to be displayed of the display panel, and determining whether an abnormal display region exists in the screen image to be displayed, wherein the abnormal display region comprises a first display region and a second display region adjacent to each other, the grayscale of each of the first sub-pixels located in the first display region is less than or equal to a predetermined grayscale, and the grayscale of each of the first sub-pixels located in the second display region is greater than the grayscale of each of the first sub-pixels located in the first display region; and when the screen image to be displayed exists in the abnormal display region, increasing the grayscale of each of the first sub-pixels located in the first display region by changing a white balance component to improve a display effect of the abnormal display region;

wherein the predetermined grayscale is 0 grayscale, in the second display region, the grayscales of the first sub-pixels are greater than or equal to 1, and the grayscale of the first sub-pixels gradually increase.

8. The grayscale calibrating method according to claim 7, wherein the step of increasing the grayscale of each of the first sub-pixels located in the first display region by changing a white balance component comprises:

obtaining an initial white balance data table of the display panel; and according to the color and the grayscale of each of the first sub-pixels located in the first display region, increasing a white balance component of the color corresponding to the grayscale in the initial white balance data table.

9. The grayscale calibrating method for a display panel according to claim 8, wherein the predetermined grayscale is 0 grayscale, the step of increasing a white balance component of the color corresponding to the grayscale in the initial white balance data table comprises:

increasing a white balance component of the color corresponding to the 0 grayscale in the initial white balance data table such that the an increase corresponding to 0 grayscale is from 1 to 20 grayscale.

10. The grayscale calibrating method for a display panel according to claim 7, wherein the predetermined grayscale ranges from 0 grayscale to 10 grayscale.

11. The grayscale calibrating method for a display panel according to claim 10, wherein the predetermined grayscale is 0 grayscale, and the screen image to be displayed is a yellow screen image, green screen image, orange screen image, or blue screen image.

12. A grayscale calibrating method for a display panel, wherein the display panel comprises data lines and first sub-pixels and second sub-pixels that are connected to each of the data lines, a color of the first sub-pixel is different from a color of the second sub-pixel, and the data line is configured to sequentially transmit data voltages to the first sub-pixels and the second sub-pixels;

wherein the grayscale calibrating method for a display panel comprises:

obtaining a screen image to be displayed of the display panel, and determining whether an abnormal display region exists in the screen image to be displayed, wherein the abnormal display region comprises a first display region and a second display region adjacent to each other, a grayscale of each of the first sub-pixels located in the first display region is less than or equal to a predetermined grayscale, the grayscale of each of the first sub-pixels located in the second display region is greater than the grayscale of each of the first sub-pixels located in the first display region, and the predetermined grayscale ranges from 0 grayscale to 10 grayscale; and when the screen image to be displayed exists in the abnormal display region, increasing the grayscale of each of the first sub-pixels located in the first display region by changing a white balance component to improve a display effect of the abnormal display region;

wherein a grayscale of each of the second sub-pixels located in the first display region and the second display region are within a predetermined grayscale range, the predetermined grayscale is less than a minimum grayscale of the predetermined grayscale range;

wherein the first sub-pixel comprises a first side and a second side intersecting each other, a length of the first side is greater than a length of the second side, and an extension direction of the data line is parallel to the second side.

13. The grayscale calibrating method according to claim 12, wherein the step of increasing the grayscale of each of the first sub-pixels located in the first display region by changing a white balance component comprises:

obtaining an initial white balance data table of the display panel; and according to the color and the grayscale of each of the first sub-pixels located in the first display region, increasing a white balance component of the color corresponding to the grayscale in the initial white balance data table.

14. The grayscale calibrating method for a display panel according to claim 13, wherein the predetermined grayscale is 0 grayscale, the step of increasing a white balance component of the color corresponding to the grayscale in the initial white balance data table comprises:

increasing a white balance component of the color corresponding to the 0 grayscale in the initial white balance data table such that the an increase corresponding to 0 grayscale is from 1 to 20 grayscale.

15. The grayscale calibrating method for a display panel according to claim 12, wherein the predetermined grayscale is 0 grayscale, and the screen image to be displayed is a yellow screen image, green screen image, orange screen image, or blue screen image.

16. The grayscale calibrating method for a display panel according to claim 12, wherein the display panel further comprises third sub-pixels connected to the data line, colors of the first sub-pixels, the second sub-pixels, and the third sub-pixels are different, the data line is configured to sequentially transmit data voltages to the first sub-pixels, the second sub-pixels and the third sub-pixels;

the first sub-pixels are blue sub-pixels, the second sub-pixels are green sub-pixels, and the third sub-pixels are red sub-pixels, in a same column of the first, second, and sub-pixels, the blue sub-pixel, the green sub-pixel and the red sub-pixel are arranged sequentially and repeatedly, and colors of the first, second, and third sub-pixels in the same columns are the same.

* * * * *